(12) United States Patent
Moradians

(10) Patent No.: US 6,789,988 B1
(45) Date of Patent: Sep. 14, 2004

(54) DEVICE FOR LATCHING A CARGO LOAD TO A TRACK

(75) Inventor: Edward Moradians, Canoga Park, CA (US)

(73) Assignee: Ancra International, LLC., Hawthorne, CA (US)

(*) Notice: Subject to any disclaimer, the term of this patent is extended or adjusted under 35 U.S.C. 154(b) by 0 days.

(21) Appl. No.: 10/364,564

(22) Filed: Feb. 10, 2003

Related U.S. Application Data
(60) Provisional application No. 60/355,954, filed on Feb. 12, 2002.

(51) Int. Cl.[7] .................................................. B60P 7/08
(52) U.S. Cl. ....................................... 410/105; 248/503
(58) Field of Search .............................. 410/77, 80, 81, 410/104, 105; 248/500, 503, 503.1

(56) References Cited

U.S. PATENT DOCUMENTS

| | | | |
|---|---|---|---|
| 2,688,504 A | * 9/1954 | Parker | ........................ 410/105 |
| 3,306,234 A | 2/1967 | Hansen | |
| 4,062,298 A | * 12/1977 | Weik | ........................... 410/105 |
| 4,109,891 A | 8/1978 | Grendahl | |
| 4,496,271 A | * 1/1985 | Spinosa et al. | ............. 410/105 |
| 4,540,080 A | 9/1985 | Nordstrom | |
| 5,489,172 A | * 2/1996 | Michler | ....................... 410/105 |

* cited by examiner

Primary Examiner—D. Glenn Dayoan
Assistant Examiner—Paul Chenevert
(74) Attorney, Agent, or Firm—Edward A. Sokolski

(57) ABSTRACT

A mounting device has a base portion which is fixedly attached to a cargo load to be supported on a track having spaced apart cutout portions which are connected to each other by lip portions. The mounting device has spaced apart tension lugs which fit within the spaced cutout portions of the track. The mounting device further has a post and arms which fit within track cutout and lip portions. Attached to the tension lugs is a connector member for slidably connecting the tension lugs to the base portion. A pin member is installed in the base portion, this pin member preventing the tension lugs from being withdrawn from the base portion. A screw is installed in the base member, which retains the tension lugs in a fixed position when tightened down into a notch formed in the connector member. In installing the cargo in the track, the connector member is slidably withdrawn from the base member along with the tension lugs and the cargo placed in position on the track with the tension lugs and post of the mounting device installed in cutout portions of the track. The connector member is then slidably installed fully in the base member with the tension lugs underneath lip portions of the track. The screw is then tightened down into the notch to retain the tension lugs in the installed position.

8 Claims, 2 Drawing Sheets

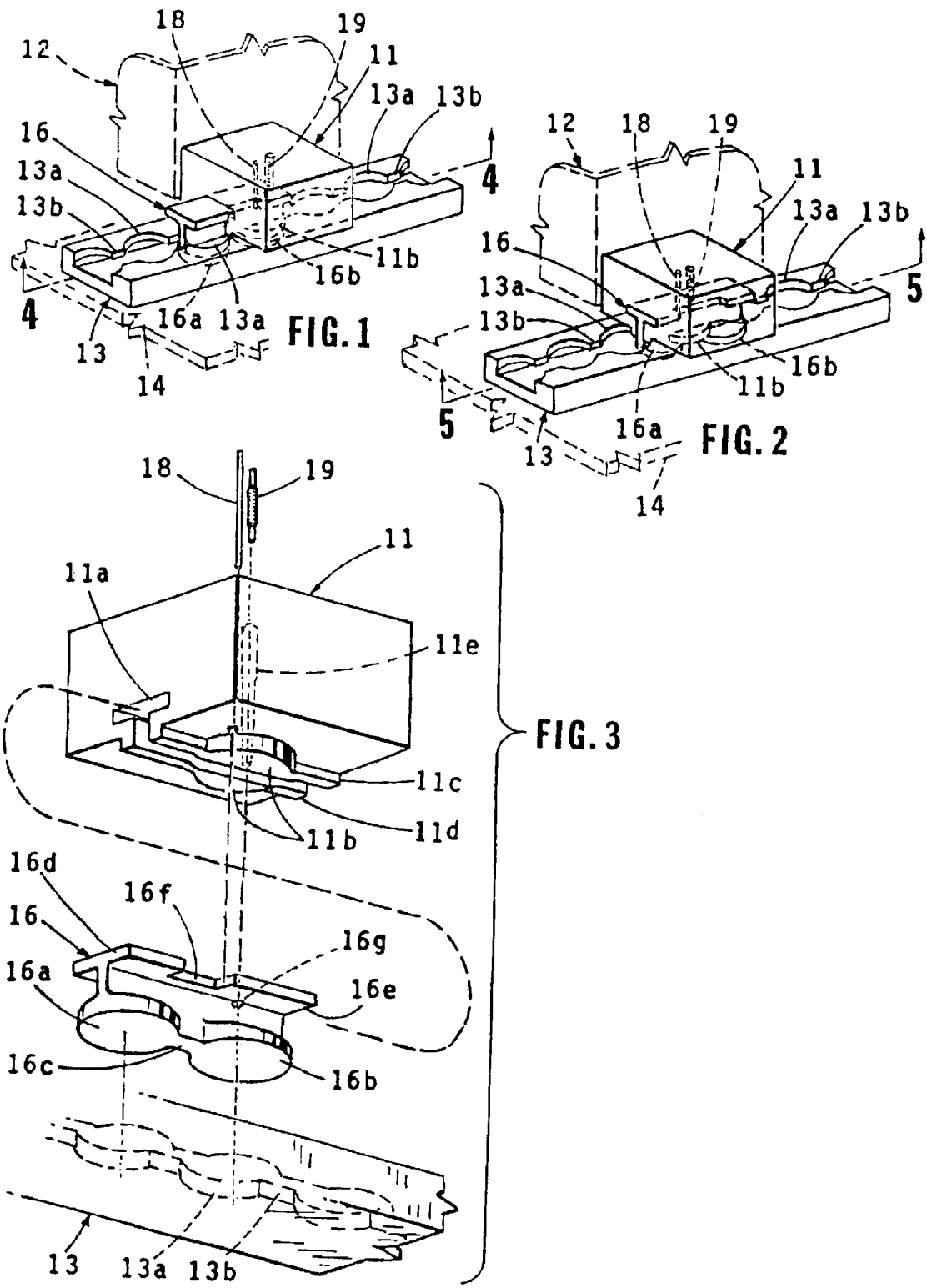

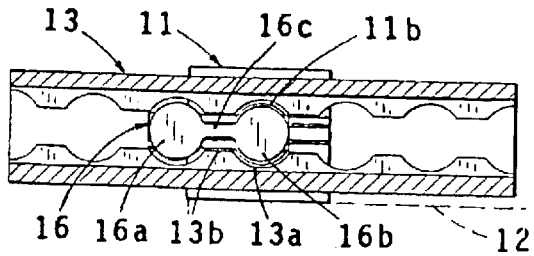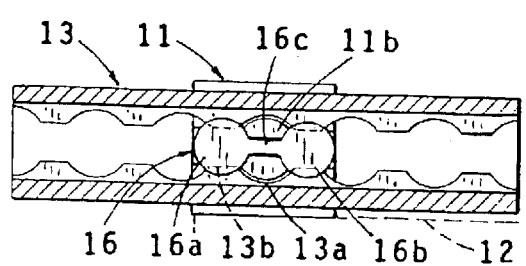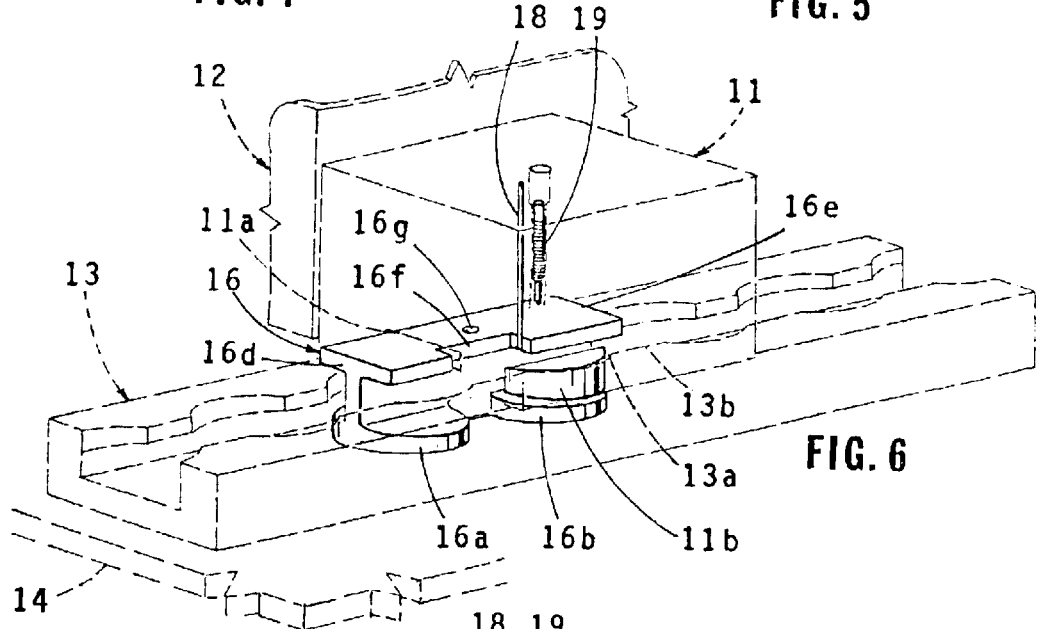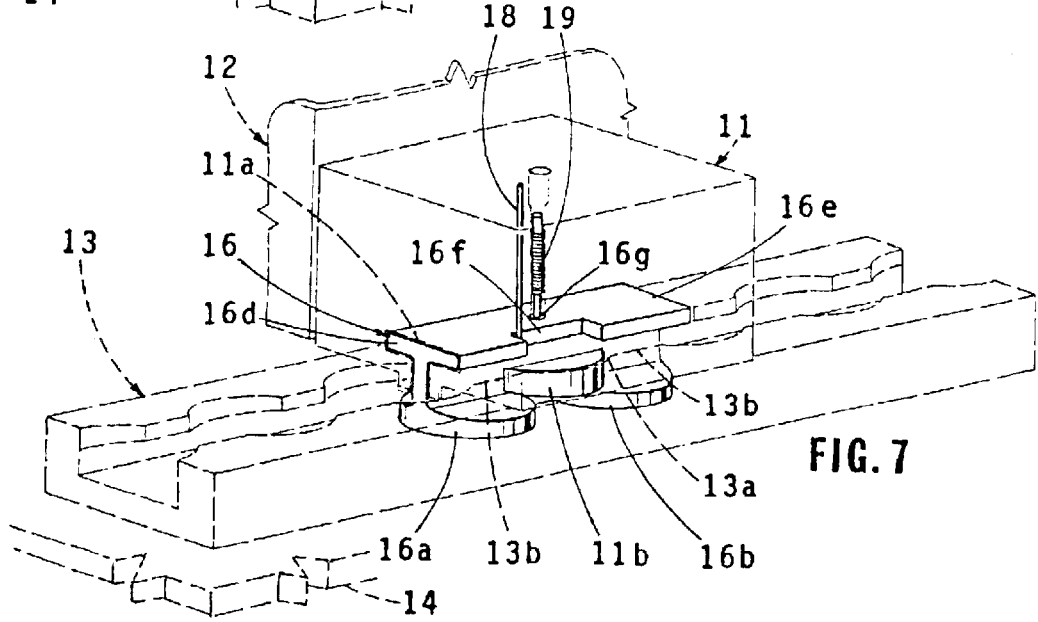

DEVICE FOR LATCHING A CARGO LOAD TO A TRACK

This application is based on Provisional Application 60/355,954 filed Feb. 12, 2002.

BACKGROUND OF THE INVENTION

1. Field of the Invention

This invention is related to loading cargo on a vehicle for transportation and more particularly to a device for mounting such cargo on a track installed in a vehicle.

2. Description of the Related Art

A track can be used to support or attach cargo to be transported to the floor of a vehicle such as an aircraft or a truck. This track typically has alternate cutout and lip portions formed thereon The device being used to attach or retain the cargo has spaced apart tension lugs which can be fitted into the cutout portions of the track. The device can then be moved along the track until the tension lugs are installed under the lip portions of the track, thereby retaining the device on the track. A device of this sort is described in U.S. Pat. No. 3,306,234 issued Feb. 28, 1967 to Hansen et al In devices such as that described by Hansen, the tension lugs with the cargo along the track to a position under the lip portions of the track. This presents a problem in situations where heavy cargo loads are involved which are difficult to move and where there are space limitations which make it difficult to reposition the cargo

SUMMARY OF THE INVENTION

The device of the present invention obviates the above shortcomings of the prior art by enabling the positioning of the tension lugs of the mounting device under the lip portions of the track without having to move the cargo. This end result is achieved in the following manner:

A mounting device has a pair of tension lugs which are connected to each other by a connector piece. Attached to the top portion of the tension lugs is a connector member for slidably connecting the tension lugs to a base member. The base member is attached to the cargo or other load to be mounted on the tracks. The connector member has T-shaped top portions which are interconnected by a bar portion, the T-shaped portions being slidably fitted within a channel formed in the base member. The connector member is prevented from completely withdrawing from the base member by a pin installed in the base member which is in line with the top cross arms of the T shaped top portions. The base member has a center post portion which fits into one of the cutout portions of the track to prevent lateral motion of the base member along the track and arm portions positioned opposite track lip portions to prevent rotational motion. The device is installed in a track having spaced apart cutout portions which are interconnected by a lip portion as follows:

With the base member attached to the cargo, the connector member is first partially withdrawn from the base member so that one of the tension lugs is out of the base member channel. The cargo is then placed on the track with the center post installed in one of the cutout portions of the track and the tension lugs fitted within adjacent cutout portions of the track. The connector member is then pushed into the base member so that it is entirely within the base member channel with the tension lugs under the lip portions of the track. A screw which is threadably mounted on the base member is tightened down to that its end fits within an aperture formed in the top of the connector member to retain this member in place with the tension members secured under the track lip portions.

DESCRIPTION OF THE DRAWINGS

FIG. 1 is a side perspective view of a preferred embodiment of the invention showing the device of the invention placed on the track but not installed therein;

FIG. 2 is a side perspective view of the embodiment of FIG. 1 installed in the track.

FIG. 3 is a side perspective exploded view of the embodiment of FIG. 1;

FIG. 4 is a cross-sectional view taken along the plane indicated in FIG. 1;

FIG. 5 is a cross-sectional view taken along the plane indicated in FIG. 2;

FIG. 6 is a side perspective view of the embodiment of FIG. 1 with the base member of the device of the invention shown in phantom with the device of the invention placed on the track but not installed therein; and FIG. 7 is a side perspective of the embodiment of FIG. 1 with the base member of the device of the invention shown in phantom with the device of the invention installed in the track

DETAILED DESCRIPTION OF THE INVENTION

Referring to the drawings, a preferred embodiment of the invention is illustrated.

A mounting device includes base member 11, which is attached to cargo or another load 12 to be mounted on tracks 13. The tracks 13 are attached to the floor 14 of a vehicle and have cutout portions 13a separated from each other by lip portions 13b. Base member 11 has a slotted center post portion 11b which fits within cutout portion 13a and prevents lateral motion of the base member along the track. Pairs of arms 11c and 11d run opposite track lip portions 13b and prevent rotational motion of the base member. The mounting device further includes a connector member 16 which has a pair of tension lugs 16a and 16b attached to each other by a connector piece 16c. Attached to the tops of the tension lugs are a pair of T-shaped portions 16d and 16e which are interconnected by a bar portion 16f.

T shaped channel 11a is formed in the bottom of base member 11, T-shaped portions 16d and 16e slidably fitting within this channel. Pin 18 is installed in an aperture formed in base member 11, this pin member being in line with the cross arms of T-shaped portions 16d and 16e thereby preventing the tension lugs from escaping from the channel. Screw 19 is threadably mounted within aperture 11c formed in the base member 11. Screw 19 when tightened down fits within aperture 16g formed in bar portion 16f thereby preventing connector member 16 and its tension lugs 16a and 16b from slidably moving in channel 11a.

The device of the invention operates as follows: With the base member attached to the cargo and with screw 19 loosened so that it is not fitted within aperture 16g, connector member 16 is partially withdrawn from channel 11a so that one of the tension lugs is out of the channel. The cargo is then installed on the track with the center post 11b installed in one of the track cutout portions 13a and adjacent tension legs installed in adjacent cutout portions of the track. The connector member is then slid fully into channel 11a so that the tension lugs 16a and 16b are under the lip portions 13b of the track. Screw 19 is then tightened down so that it is within aperture 16g.

The mounting device and the cargo attached thereto are thus retained in position on the track against both vertical and lateral movement.

While the invention has been described and illustrated in detail, it is to be understood that this is by way only of illustration and example only and not to be taken by way of limitation, the scope and spirit of the invention being limited by the following claims.

I claim:

1. A device for mounting a load onto a track installed on the floor of a vehicle, said track having spaced apart cutout portions connected to each other by lip portions comprising:
    a base member, said base member being attached to said load;
    a mounting device having spaced apart tension lugs which fit within the cutout portions of said track and a connector piece interconnecting said tension lugs;
    said mounting device being slidably positionable on said base member in a first position whereat one of said tension lugs is withdrawn from said base member and a second position whereat both of said tension lugs are within said base member;
    means on said base member for preventing lateral and rotational movement of said base member on said track comprising a post portion of said base member fitted into a cutout portion of the track, and a pair of arms extending from said post portion fitted into lip portions of the track;
    means for preventing said mounting device from being fully withdrawn from said base member; and
    means for retaining said mounting device in said second position,
    whereby when said mounting device is in said first position, said tension lugs are installed in said cutout portions of said track and when said mounting device is in said second position, the tension lugs are installed beneath lip portions of said track.

2. The device of claim 1 wherein said load comprises a vehicle cargo.

3. The device of claim 1 wherein said means for preventing the mounting device from being completely fully withdrawn from said base member comprises a pin member installed in said base member, said mounting device having T-shaped portions the slidable paths of which are blocked by the lower end of the pin member.

4. The device of claim 1 wherein said means for retaining the mounting device in said second position comprises an aperture formed in the top portion of said mounting device and a screw installed in said base member which is driven into said aperture.

5. A device for mounting a load onto a track installed on the floor of a vehicle, said track having spaced apart cutout portions connected to each other by lip portions comprising;
    a base member, said base member being attached to said load; said base member having a T-shaped channel formed therein;
    a mounting device having spaced apart tension lugs and a connector piece interconnecting said tension lugs, said connector piece having T-shaped portions slidably fitting within the T-shaped channel of said base member, said mounting device being positionable slidably in a first position whereat one of said tension lugs is withdrawn from said base member and the tension lugs are installed in the cutout portions of said track and a second position whereat both of said tension lugs are fully within said base member and the tension lugs are installed under the lip portions of said track;
    means on said base member for preventing lateral and rotational movement of said base member on the track comprising a post portion of said base member fitted into a cutout portion of the track and a pair of arms extending from said post portion fitted into lip portions of the track;
    a screw mounted on said base member, said mounting device having an aperture into which said can be driven to retain the mounting device in said second position; and
    means mounted in said base member for preventing said mounting device from being fully withdrawn from said base member.

6. The device of claim 5 wherein said means for preventing said mounting device from being fully withdrawn from said base member comprises a pin installed in said base member installed in the path of the T-shaped portions of said connector piece.

7. The device of claim 5 wherein the T-shaped portions of said connector piece are interconnected by a bar portion, the aperture of said mounting device being formed in said bar portion.

8. The device of claim 5 wherein said means for preventing lateral movement of said base member comprises a center post portion of said base member.

\* \* \* \* \*